United States Patent [19]

Kitano

[11] Patent Number: 5,130,933
[45] Date of Patent: Jul. 14, 1992

[54] ROTATION SENSING SYSTEM HAVING SENSOR MALFUNCTION DETECTION

[75] Inventor: Yuichi Kitano, Higashimatsuyama, Japan

[73] Assignee: Zexel Corporation, Tokyo, Japan

[21] Appl. No.: 575,805

[22] Filed: Aug. 31, 1990

[30] Foreign Application Priority Data

Sep. 27, 1989 [JP] Japan .................. 1-112118[U]

[51] Int. Cl.$^5$ .................. G06F 15/46; G01P 13/00
[52] U.S. Cl. .................. 364/487; 324/160; 324/207.25; 364/551.01; 364/565
[58] Field of Search .................. 364/565, 550, 551.01, 364/424.03, 426.04, 426.05, 431.07, 487, 569; 73/1 R, 1 D, 2, 118.1; 324/207.25, 160

[56] References Cited

U.S. PATENT DOCUMENTS

| | | | |
|---|---|---|---|
| 4,249,238 | 2/1981 | Spang, III et al. | 364/431.02 |
| 4,263,652 | 4/1981 | Henrich | 364/551.01 |
| 4,337,516 | 6/1982 | Murphy et al. | 364/551.01 |
| 4,449,191 | 5/1984 | Mehnert | 364/565 |
| 4,564,916 | 1/1986 | Hori et al. | 364/551.01 |
| 4,656,588 | 4/1987 | Kubo | 364/426.02 |
| 4,718,016 | 1/1988 | Sudo | 364/431.07 |
| 4,777,611 | 10/1988 | Tashiro et al. | 364/551.01 |
| 4,825,691 | 5/1989 | Sekiguchi | 73/118.1 |
| 4,979,117 | 12/1990 | Hattori et al. | 364/431.07 |
| 5,005,142 | 4/1991 | Lipchak et al. | 364/550 |

FOREIGN PATENT DOCUMENTS 50-155950 12/1975 Japan .
61-3067 1/1986 Japan .

Primary Examiner—Kevin J. Teska
Attorney, Agent, or Firm—Fish & Richardson

[57] ABSTRACT

A rotation sensing system includes a rotation sensor for outputting sinusoidal pulses, a waveform shaping circuit for shaping each of the sinusoidal pulses into a rectangular pulse, and a microcomputer for receiving an output of the waveform shaping circuit. In the microcomputer, the rectangular pulse appearing in the output of the waveform shaping circuit is processed so as to obtain information on the rotation of an object to be sensed, and also a malfunction of the rotation sensor is detected. Namely, when the rectangular pulse is not inputted into the microcomputer during a set time period, and at the same time when the level of the output of the waveform shaping circuit is equal to the level of the rectangular pulse, the microcomputer produces a signal representative of the malfunction of the rotation sensor.

6 Claims, 2 Drawing Sheets

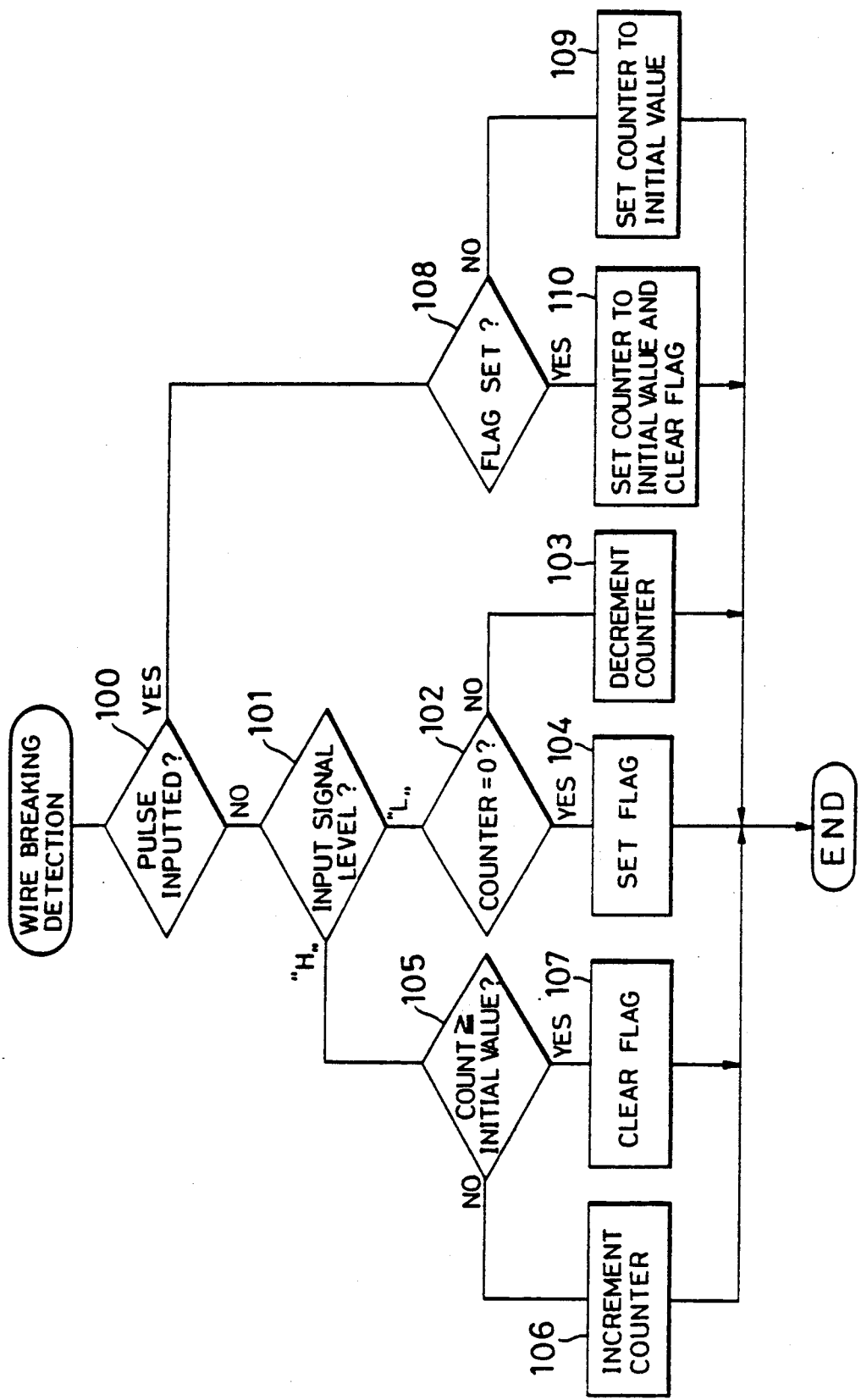

ROTATION SENSING SYSTEM HAVING SENSOR MALFUNCTION DETECTION

FIELD OF THE INVENTION

This invention relates to a rotation sensing system having the function of detecting a malfunction of a rotation sensor.

BACKGROUND OF THE INVENTION

A rotation sensing system disclosed in Japanese Laid-Open (Kokai) Patent Application No. 3067/86 comprises a rotation sensor in the form of an electromagnetic pickup or a Hall element. The rotation sensor outputs sinusoidal pulses in accordance with the rotation of an object to be sensed. Each of the sinusoidal pulses from the rotation sensor is shaped into a rectangular pulse by a waveform shaping circuit including a comparator. Although not clearly described in the above Japanese Laid-Open application, generally, the rectangular pulses are fed to a control portion having a microcomputer. In this control portion, the input rectangular pulses are processed so as to obtain information on the rotation of the object to be sensed.

The rotation sensing system described in the above Japanese Laid-Open Patent Application No. 3067/86 further comprises a circuit for detecting a malfunction of the rotation sensor. This malfunction detection circuit basically comprises a low-pass filter, and a window comparator. A voltage signal from the rotation sensor is fed to the low-pass filter, so that only the direct current (DC) component of this signal is outputted from the low-pass filter. In the window comparator, this DC component is compared with reference voltages. For example, when the rotation sensor is subjected to a wire breaking (malfunction), the voltage level of the DC component exceeds one of the reference voltages, so that a malfunction detection signal of a high level is outputted from the window comparator.

Japanese Laid-Open Patent Application No. 155950/75 also discloses a malfunction detection circuit comprising a low-pass filter and a comparator.

The rotation sensing systems disclosed in the above Japanese Laid-Open Patent Application Nos. 155950/75 and 3067/86 are disadvantageous in that the construction of the circuitry is complicated because of the need for the addition of the malfunction detection circuit comprising the low-pass filter and the comparator.

U.S. Pat. No. 4,825,691 discloses a rotation sensing system which comprises a pair of rotation sensors for sensing the rotations of two objects to be sensed, respectively, which objects are rotated in associated relation to each other, each of the rotation sensors being in the form of an electromagnetic pickup. In this system, as in the above-mentioned systems, sinusoidal pulses outputted respectively from the two rotation sensors are shaped into respective rectangular pulses by respective waveform shaping circuits each comprising a comparator, and then are inputted into a microcomputer. In the microcomputer, the inputted rectangular pulses are processed so as to obtain information on the rotations of the two objects to be sensed.

The microcomputer of this system has the function of detecting a malfunction. More specifically, when the rectangular pulse from one of the rotation sensors is not inputted into the microcomputer even if the rectangular pulse from the other rotation sensor is inputted into the microcomputer, it is judged that the rotation sensor is subjected to a malfunction.

The system disclosed in the above U. S. patent, however, requires the plurality of rotation sensors for the purpose of the malfunction detection, and therefore this technique can not be applied to a system having only one rotation sensor. Moreover, when both of the two rotation sensors are subjected to malfunction at the same time, the rectangular pulses from these sensors are not inputted into the microcomputer. This condition is the same as the condition in which the rotations of the objects to be sensed are stopped. Therefore, it is not judged whether the former condition represents a malfunction or the stopping of the rotations of the objects to be sensed.

SUMMARY OF THE INVENTION

It is therefore an object of this invention to provide a rotation sensing system which can detect a malfunction of a rotation sensor with a simple construction.

According to the present invention, there is provided a rotation sensing system comprising:

(a) a rotation sensor for outputting sinusoidal pulses in accordance with the rotation of an object to be sensed;

(b) a waveform shaping circuit for shaping each of the sinusoidal pulses into a rectangular pulse; and (c) a microcomputer for receiving an output of the waveform shaping circuit, the microcomputer comprising:

(i) processing means for processing the rectangular pulses, appearing in the output of the waveform shaping circuit, so as to obtain information on the rotation of the object to be sensed;

(ii) pulse input judgment means for judging whether or not the rectangular pulse is inputted to the microcomputer during a set time period;

(iii) level judgment means for judging whether the output of the waveform shaping circuit is at a high level or at a low level; and (iv) malfunction judgment signal-generating means for generating a malfunction judgment signal representative of a malfunction of the rotation sensor when the pulse input judgment means judges that the rectangular pulse is not inputted into the microcomputer during the set time period, and at the same time when the level judgment means judges that the level of the output of the waveform shaping means is equal to the level of the rectangular pulse.

BRIEF DESCRIPTION OF THE DRAWINGS

FIG. 3 is a flow chart of a malfunction detection routine to be executed by a microcomputer.

DESCRIPTION OF THE PREFERRED EMBODIMENT OF THE INVENTION

Figure 1:
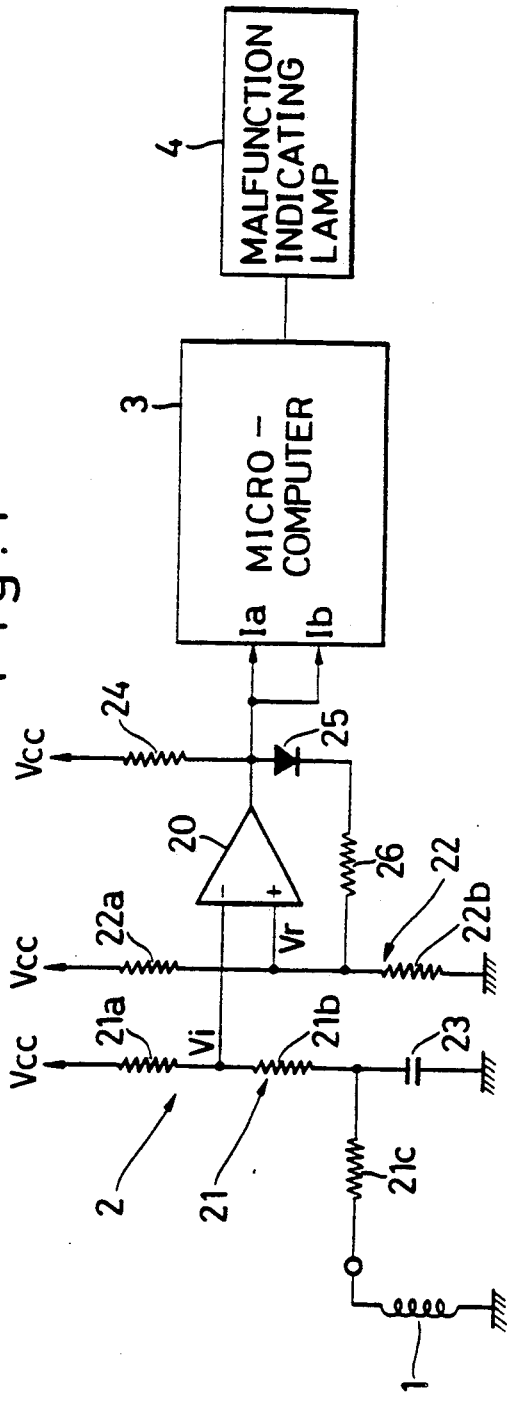
FIG. 1 is a circuit diagram of a rotation sensing system provided in accordance with the present invention.

One preferred embodiment of the invention will now be described with reference to the drawings.

A rotation sensing system comprises a rotation sensor 1, a waveform shaping circuit 2, a microcomputer 3, and a malfunction indicating lamp 4.

The rotation sensor 1 is in the form of an electromagnetic pickup including an iron core and a coil. One terminal of the rotation sensor 1 is grounded whereas the other terminal thereof is connected to the waveform shaping circuit 2. The rotation sensor 1 is disposed in the vicinity of a peripheral surface of a pulser fixedly connected to an object to be sensed, such as an output shaft of an engine. Projections are formed on the peripheral surface of the pulser. Each time each of the projections on the peripheral surface of the pulser passes past the rotation sensor 1 during the rotation of the engine, a sinusoidal pulse is outputted from the other terminal of the rotation sensor 1.

The waveform shaping circuit 2 includes a comparator 20. A signal voltage Vi from an input circuit 21 is inputted into an inverted input terminal of the comparator 20, and a reference voltage Vr from a reference voltage generating circuit 22 is inputted into a non-inverted input terminal of the comparator 20.

The input circuit 21 is composed of resistors 21a, 21b and 21c connected in series in this order, and one terminal of the input circuit 21 is connected to a constant voltage source Vcc whereas the other terminal thereof is connected to the other terminal of the rotation sensor 1. The voltage at the junction point between the resistor 21a and the resistor 21b is inputted as the signal voltage Vi to the inverted input terminal of the comparator 20. When the rotation sensor 1 does not generate the sinusoidal pulses, the signal voltage Vi is of a level equal to the voltage obtained by dividing the constant voltage Vcc by the resistance of the resistors 21a and the total resistance of the resistors 21b and 21c and the rotation sensor 1. The signal voltage Vi is varied in response to the sinusoidal pulses generated from the rotation sensor 1. A capacitor 23 is coupled between the ground and the junction point between the resistors 21b and 21c.

The reference voltage generating circuit 22 has resistors 22a and 22b connected in series between the constant voltage source Vcc and the ground, the two resistors 22a and 22b being arranged in this order from the constant voltage source Vcc. The voltage at the junction point between the two resistors 22a and 22b is inputted as the reference voltage Vr into the non-inverted input terminal of the comparator 20.

The output terminal of the comparator 20 is connected to the constant voltage source Vcc via a resistor 24, and is also connected to the non-inverted input terminal of the comparator 20 via a diode 25 and a resistor 26. The comparator 20 has hysteresis characteristics because of the provision of the resistors 24 and 26 and the diode 25. More specifically, when the output of the comparator 20 is at a low level, the diode 25 is rendered non-conductive, so that the level of the reference voltage Vr is determined by dividing the constant voltage Vcc by the two resistors 22a and 22b of the reference voltage generating circuit 22. Hereinafter, this voltage level will be referred to as "lower reference voltage level". When the rotation sensor 1 does not generate the sinusoidal pulses, the level of the signal voltage Vi from the input circuit 21 is predetermined to be equal to this lower reference voltage level. When the output of the comparator 20 is at a high level, the diode 25 is rendered conductive, so that additional current is supplied from the constant voltage source Vcc to the resistor 22b via the resistor 24, the diode 25 and the resistor 26. As a result, the reference voltage Vr becomes higher than the above lower reference voltage level by an amount corresponding to a voltage drop developing across the resistor 22b due to the above additional current. Hereinafter, this voltage level will be referred to as "upper reference voltage level".

The microcomputer 3 has an interrupt signal input terminal 1a and a signal level input terminal 1b, and these input terminals 1a and 1b are connected to the output terminal of the comparator 20. The malfunction indicating lamp 4 is connected to one output terminal of the microcomputer 3. An actuator (not shown) for controlling the supply of a fuel to the engine, and other devices are connected to the other output terminals of the microcomputer 3, respectively.

In the above construction, the signal voltage Vi and the reference voltage Vr to be inputted into the comparator 20, as well as the output Vout of the comparator 20, will now be described with reference to FIG. 2. Reference is first made to a normal condition in which the rotation sensor 1 is not subjected to a wire breaking (malfunction). When the power source is turned on, the current from the constant voltage source Vcc flows to the capacitor 23 via the resistors 21a and 21b. Therefore, at the time when the power source is turned on, the signal voltage Vi to be inputted into the comparator 20 is rendered to a level obtained by dividing the constant voltage Vcc by the resistors 21a and 21b, and thereafter the level of the signal voltage Vi goes high, but is lower than the lower reference voltage level before the charge of the capacitor 23 is completed. On the other hand, the reference voltage Vr from the reference voltage generating circuit 22 is instantaneously rendered to either the upper reference voltage level or the lower reference voltage level. Therefore, the output of the comparator 20 is at the high level from the beginning. Thus, the capacitor 23 serves to initialize the comparator 20 to positively bring the output of the comparator 20 into the high level.

When the charge of the capacitor 23 is completed, the signal voltage Vi reaches the lower reference voltage level and is stably maintained at this level. At this time, since the output of the comparator 20 has already been at the high level, the reference voltage Vr is at the upper reference voltage level. Therefore, the output Vout of the comparator 20 is maintained at the high level.

During a first half-cycle of the sinusoidal pulse from the rotation sensor 1, first, the signal voltage Vi goes high, and reaches the upper reference voltage level whereupon the output Vout of the comparator 20 is switched to the low level, and simultaneously therewith the reference voltage Vr also goes low to the lower reference voltage level. When the signal voltage Vi goes low from the peak value to reach the lower reference voltage level, the output Vout of the comparator 20 is again switched to the high level. As a result, there is obtained a rectangular pulse of a low level substantially corresponding to the first half-cycle of the sinusoidal pulse.

During the second half-cycle of the sinusoidal pulse, the output of the comparator 20 is maintained at the high level since the signal voltage Vi is lower than the upper reference voltage level. Subsequently, the output of the comparator 20 is maintained at the high level until the next sinusoidal pulse is inputted.

Figure 2:
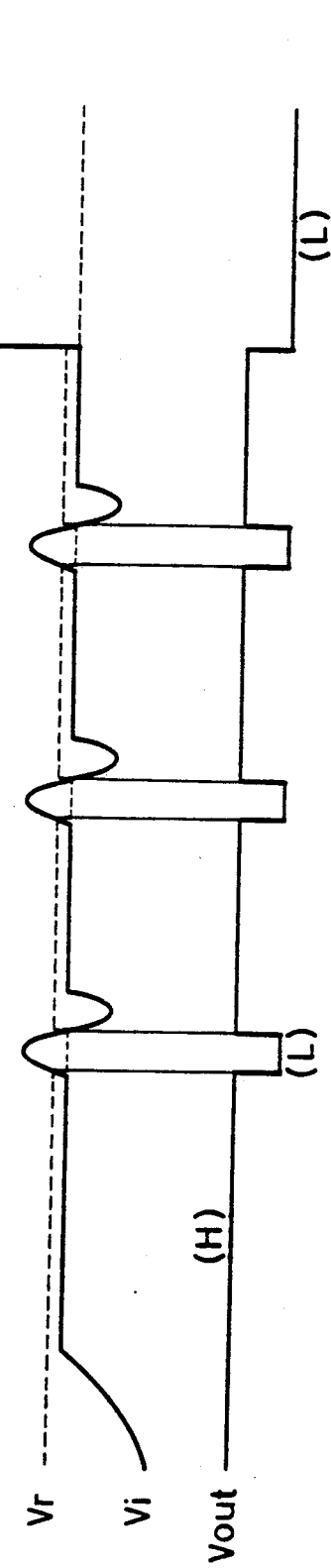
FIG. 2 is a time chart illustrative of input and output of a waveform shaping circuit of the rotation sensing system.

When the rotation sensor 1 is subjected to a wire breaking during the sensing of the rotation, the signal voltage Vi goes high to the constant voltage Vcc as shown in FIG. 2, so that the output of the comparator 20 is switched to the low level, and thereafter is maintained at this low level even when the output shaft of the engine (i.e., the object to be sensed) is rotated.

If the rotation sensor has been subjected to a wire breaking before the power source is turned on, the signal voltage Vi instantaneously goes to the constant voltage Vcc upon turning-on of the power source. Therefore, the output Vout of the comparator 20 is at the low level from the beginning, and is maintained at this low level.

Next, routines to be executed by the microcomputer 3 will now be described. The rectangular pulse from the comparator 20 of the waveform shaping circuit 2 (more exactly, the trailing edge of the rectangular pulse) is inputted as an interrupt signal to the interrupt signal input terminal 1a of the microcomputer 3. The microcomputer 3 executes an interrupt routine in response to this interrupt signal. More specifically, in accordance with a time period between the time of inputting of the rectangular pulse (interrupt signal) and the time of inputting of the precedingly-inputted rectangular pulse (interrupt signal), the frequency and speed of the rotation of the object to be sensed are determined.

In the microcomputer 3, a malfunction detection routine shown in FIG. 3 is activated periodically, for example, at intervals of 20 msec. A cleared (down) state of a wire breaking flag used in this routine represents the normal condition of the rotation sensor 1, and a set (up) state of this flag represents the condition of the wire breaking of the rotation sensor 1. An initial value (count) of a counter used in this routine is set, for example, to "25", and each time it is judged that the rotation sensor 1 is subjected to a wire breaking, this counter is decremented by one. Each time it is judged that the rotation sensor is in the normal condition, the counter is incremented by one. Therefore, the count 0 means that the judgment of the wire breaking has been made 25 times.

The above malfunction detection routine will now be described in detail. First, in Step 100, it is judged whether or not any rectangular pulse has been inputted as the interrupt signal into the interrupt signal input terminal 1a during the past one second. If the rectangular pulse has been inputted into the interrupt signal input terminal 1a, this means that the object to be sensed is rotating and that the rotation sensor 1 is in the normal condition. In contrast, if the rectangular pulse has not been inputted, this means either that the object to be sensed is not rotating or that the rotation sensor 1 is subjected to a wire breaking.

If it is judged in Step 100 that no rectangular pulse has been inputted, the routine proceeds to the next Step 101 in which the level of the signal inputted from the comparator 20 into the signal level input terminal 1b is judged. If it is judged in Step 101 that the signal level is the low level (that is, it is tentatively judged that the rotation sensor 1 is subjected to a wire breaking), the routine proceeds to the next Step 102 in which it is judged whether or not the count of the counter is zero. If this count is not zero, the counter is decremented by one in Step 103, and the wire breaking detection routine is finished. If the rotation sensor 1 is subjected to a wire breaking, the above steps 100 to 103 are repeated until the count of the counter becomes zero. When the count of the counter becomes zero, this is detected in Step 102, and then the wire breaking flag is set in Step 104. Thus, by the use of the counter, the wire breaking flag is not set until after the wire breaking judgment is made a predetermined number of times, and therefore even if there are noises, an erroneous decision of the wire breaking can be avoided.

If it is judged in the above Step 100 that the output of the comparator 20 is at the high level, the routine proceeds to Step 105, judging that the rotation of the object to be sensed is stopped and that the rotation sensor 1 is not subjected to a wire breaking. In this Step 105, it is judged whether or not the count of the counter is not less than the initial value. If the result of this judgment is "NO", the counter is incremented by one (Step 106), and this routine is finished. In contrast, if it is judged in Step 105 that the count of the counter is not less than the initial value, the wire breaking flag is cleared (Step 107). Thus, when the normal condition of the rotation sensor 1 is judged instead of the wire breaking judgment, the influence of noises can be eliminated by the use of the counter.

If it is judged in the above Step 100 that the pulse has been inputted from the comparator 20 into the microcomputer 3 for the past one second, the routine proceeds to Step 108 in which it is judged whether or not the wire breaking flag is set. If this judgment result is "NO", the value of the counter is returned to the initial value (Step 109). In contrast, if the judgment result of Step 108 is "YES", the value of the counter is returned to the initial value, and also the wire breaking flag is cleared (Step 110). Thus, when the inputting of the rectangular pulse is detected, the program is immediately ready for effecting the normal control mentioned below.

If the wire breaking flag is set, the microcomputer 3 causes the malfunction indicating lamp 4 to be lit, and also either effects the control of the actuator without depending on the signal from the rotation sensor 1 or moves the actuator to a safe position. If the wire breaking flag is cleared, the microcomputer 3 causes the malfunction indicating lamp 4 to be turned off, and the normal actuator control is carried out in accordance with the rotation information obtained through the processing of the rectangular pulses by the microcomputer 3.

As described above, the microcomputer 3 judges the malfunction of the rotation sensor 1, based on the two kinds of information (that is, the information on the inputting of the rectangular pulse from the waveform shaping circuit during the set time period and the information on the level of the output of the waveform shaping circuit), and therefore the judgment can be made quite accurately. Further, since the judgment of the malfunction of the rotation sensor 1 is made by the microcomputer 3, this system, unlike the conventional system, does not require a malfunction detection circuit including a low-pass filter and a comparator, and therefore the construction of the circuitry can be simplified. Further, even where only one rotation sensor is used, its malfunction can be detected.

The present invention is not to be restricted to the above embodiment, and various modifications can be made. For example, the interrupt signal input terminal 1a and the signal level input terminal 1b of the microcomputer 3 can be combined into a common terminal.

A magneto-resistance element, a Hall element or the like can be used as the rotation sensor.

As described above, the microcomputer judges whether or not the rectangular pulse has been inputted thereto during the set time period preceding the time point of this judgment. In this case, this set time period may be variable. For example, when the speed of the rotation to be sensed is high, the set time period is shorter, and when the rotational speed is low, the set time period is longer.

What is claimed is:

1. A rotation sensing system comprising:
   (a) a rotation sensor outputting sinusoidal pulses in response to the rotation of an object;
   (b) a waveform shaping circuit for shaping each of said sinusoidal pulses into a rectangular pulse, the level of said rectangular pulse being one of two binary logic levels, the level of an output of said waveform shaping circuit being the other level of the two binary logic levels when said waveform shaping circuit does not receive said sinusoidal pulse; and
   (c) a microcomputer for receiving the output of said waveform shaping circuit, said microcomputer comprising:
      (i) processing means of processing said rectangular pulses to obtain information on the rotation of said object; and
      (ii) malfunction detecting means for detecting malfunction of said rotation sensor, said malfunction detecting means comprising:
         pulse input judgment means for judging whether or not said rectangular pulses are inputted to said microcomputer during a set time period;
         level judgment means for judging whether the output of said waveform shaping circuit is at said one level or at the other level; and
         malfunction judgment signal-generating means for generating a malfunction judgment signal representative of a malfunction of said rotation sensor when said pulse input judgment means judges that the rectangular pulse is not inputted into said microcomputer during said set time period, and at the same time when said level judgment means judges that the level of the output of said waveform shaping means is equal to said one level.

2. A rotation sensing system according to claim 1, in which said waveform shaping circuit comprises:
   (a) a comparator having two input terminals;
   (b) a circuit for generating a reference voltage, said reference voltage being inputted into one of said input terminals of said comparator; and
   (c) an input circuit having at least one resistor, said resistor and said rotation sensor being connected in series to form a series circuit, one terminal of said series circuit being connected to a constant voltage source whereas the other terminal thereof is grounded, a voltage at a point on said series circuit which point is disposed between said resistor and said rotation sensor being inputted as a signal voltage into the other input terminal of said comparator, and said comparator comparing said signal voltage with said reference voltage to output a voltage of either a high level or a low level when said signal voltage is higher than said reference voltage, and, when said signal voltage is lower than said reference voltage, to output a voltage of of the low level if the voltage output is high when said signal voltage is higher than said reference voltage and to output a voltage of the high level if the voltage output is low when said signal voltage is higher than said reference voltage, thereby shaping said sinusoidal pulse from said rotation sensor into said rectangular pulse.

3. A rotation sensing system according to claim 1, further comprising a malfunction alarm device connected to said microcomputer, said malfunction alarm device being responsive to said malfunction judgment signal, produced by said malfunction judgment signal-generating means of said microcomputer, to give an alarm of the malfunction.

4. A rotation sensing system according to claim 1, in which said malfunction detecting means is activated periodically.

5. A rotation sensing system according to claim 1, in which an edge of each of said rectangular pulses is an interrupt signal, and said pulse input judgment means judges whether or not said interrupt signals are inputted to said microcomputer during the set time period.

6. A rotation sensing system comprising:
   (a) a rotation sensor outputting sinusoidal pulses in response to the rotation of an object;
   (b) a waveform shaping circuit for shaping each of said sinusoidal pulses into a rectangular pulse, the level of said rectangular pulse being one of two binary logic levels, the level of an output of said waveform shaping circuit being the other level of the two binary logic levels when said waveform shaping circuit does not receive said sinusoidal pulse; and
   (c) a microcomputer for receiving the output of said waveform shaping circuit, said microcomputer comprising:
      (i) processing means for processing said rectangular pulses to obtain information on the rotation of said object; and
      (ii) malfunction detecting means for detecting malfunction of said rotation sensor, said malfunction detecting means comprising:
         pulse input judgment means for judging whether or not said rectangular pulses are inputted to said microcomputer during a set time period;
         level judgment means for judging whether the output of said waveform shaping circuit is at said one level or at the other level; and
         malfunction judgment signal-generating means for generating a malfunction judgment signal representative of a malfunction of said rotation sensor when said pulse input judgment means judges a plurality of times that said rectangular pulse is not inputted to said microcomputer during said set time period, and at the same time when said level judgment means judges the same number of times that the level of the output of said waveform shaping means is equal to said one level.

* * * * *